David Dalzell.
Axle-Box.
117390  PATENTED JUL 25 1871
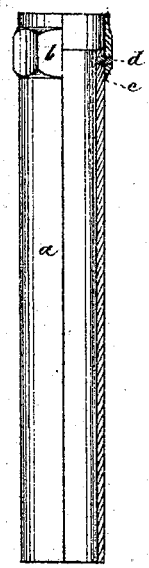
Witnesses:
Inventor:
David Dalzell.
Per
Attorneys.

UNITED STATES PATENT OFFICE.

DAVID DALZELL, OF SOUTH EGREMONT, MASSACHUSETTS.

IMPROVEMENT IN AXLE-BOXES.

Specification forming part of Letters Patent No. 117,390, dated July 25, 1871.

*To all whom it may concern:*

Be it known that I, DAVID DALZELL, of South Egremont, in the county of Berkshire and State of Massachusetts, have invented a new and Improved Axle-Box; and I do hereby declare the following to be a full, clear, and exact description of the same, reference being had to the accompanying drawing making a part of this specification, in which the figure is a plan, partly in section.

This invention relates to an improvement on the invention for which Letters Patent No. 104,469, dated August 16, 1870, were granted me, said invention consisting in an axle-box composed of two parts, that one of which that turns on the axle being a wrought-iron case-hardened tube, and the other part or end piece, which is subjected to no great wear, and which has heretofore been forged solid with the tube at great expense and with much trouble, being of malleable cast-iron or other metal. The improvement consists in connecting said parts by means of a perfectly-fitted joint, the tube, formed without shoulder at its end or other diminution, entering within the end piece, and by means of a tapped hole running through both the end piece and the tube, and a threaded wire screwed into said hole and cut off flush with the surfaces at the ends thereof.

Referring to the drawing, $a$ is the piece of wrought-iron case-hardened tubing that turns on the axle; and $b$ is the malleable-iron end piece, the same having a cylindrical bore turned smooth, and a polygonal exterior. The tube $a$, formed without a shoulder and of full size, enters within the end piece $d$, the joint between the two being a perfectly-fitting one. After these two parts are pressed together a tapped hole is made through the end piece, and tube, and a threaded wire, $d$, screwed into the hole and then cut off flush with the outside of the end piece $b$. By this device the two parts are easily connected in such a way that it is impossible for them to become separate.

If desired, the parts $a$ $b$ may be additionally secured together by a method commonly practiced in machine-shops, namely, by applying some suitable acid to the joint for the purpose of causing the surfaces to rust together.

Having thus described my invention, what I claim as new, and desire to secure by Letters Patent, is—

The combination of the tubular axle-box $a$ and end piece $b$ by means of a perfectly-fitting joint between the two, and a tapped hole made through both, and a threaded wire, $d$, screwed thereinto, as specified.

DAVID DALZELL.

Witnesses:
A. BRANCH,
JOHN J. BAKER.